United States Patent [19]

Jacobson et al.

[11] Patent Number: 5,866,900
[45] Date of Patent: Feb. 2, 1999

[54] METHOD AND APPARATUS FOR CALIBRATING A FOCAL PLANE ARRAY OF AN IMAGE DETECTOR

[75] Inventors: Keith A. Jacobson, Flower Mound; Val J. Herrera, Double Oak; James A. Harder, Bedford, all of Tex.

[73] Assignee: Raytheon TI Systems, Inc., Lewisville, Tex.

[21] Appl. No.: 768,877

[22] Filed: Dec. 17, 1996

Related U.S. Application Data

[60] Provisional application No. 60/009,719 Jan. 5, 1996.
[51] Int. Cl.[6] ........................................... H01L 31/00
[52] U.S. Cl. ........................................... 250/252.1
[58] Field of Search ................................. 250/252.1

[56] References Cited

U.S. PATENT DOCUMENTS

| | | |
|---|---|---|
| 4,129,853 | 12/1978 | Althauser et al. . |
| 4,304,459 | 12/1981 | Kramer . |
| 4,400,729 | 8/1983 | Jones . |
| 4,404,597 | 9/1983 | Stoffel . |
| 4,514,739 | 4/1985 | Johnson et al. . |
| 4,641,358 | 2/1987 | Archambeault et al. . |
| 4,695,722 | 9/1987 | Motooka . |
| 4,834,539 | 5/1989 | Le Bris et al. . |
| 4,870,273 | 9/1989 | Brueggemann . |
| 4,876,453 | 10/1989 | Wirick ........................ 250/332 |
| 4,936,643 | 6/1990 | Beiser . |
| 4,941,719 | 7/1990 | Hisada et al. . |
| 4,973,112 | 11/1990 | Kramer . |
| 5,065,444 | 11/1991 | Garber . |
| 5,114,217 | 5/1992 | Beiser . |
| 5,142,403 | 8/1992 | Ossman . |
| 5,208,694 | 5/1993 | Tomita . |
| 5,208,701 | 5/1993 | Maeda . |
| 5,258,775 | 11/1993 | Casey et al. . |
| 5,281,812 | 1/1994 | Lee et al. . |
| 5,373,151 | 12/1994 | Eckel, Jr. et al. ............ 250/208.1 |
| 5,519,441 | 5/1996 | Gusmano et al. . |
| 5,705,811 | 1/1998 | Harder et al. ................ 250/252.1 |
| 5,745,285 | 4/1998 | Harder et al. ................ 359/356 |

*Primary Examiner*—Constantine Hannaher
*Attorney, Agent, or Firm*—Baker & Botts, L.L.P.

[57] ABSTRACT

An image detection system (10) includes a derotation optics assembly (24) that stabilizes images viewed from a scene (14) by individual detector elements (31) in a focal plane array (32). The derotation optics assembly (24) also is used in providing scene based calibration to the individual detector elements (31). The derotation optics assembly (24) places images viewed from the scene (14) in a first rotation position. The individual detector elements (31) collect scene based energy at the first rotation position. The derotation optics assembly (24) places images viewed from the scene (14) in a second rotation position. The individual detector elements (31) collect scene based energy at the second rotation position. Comparisons are made among outputs of the individual detector elements (31) at the first and second rotation positions. Correction factors for each of the individual detector elements (31) are adjusted in response to the comparisons in order to compensate for the differing voltage offsets and gains among the individual detector elements (31).

28 Claims, 3 Drawing Sheets

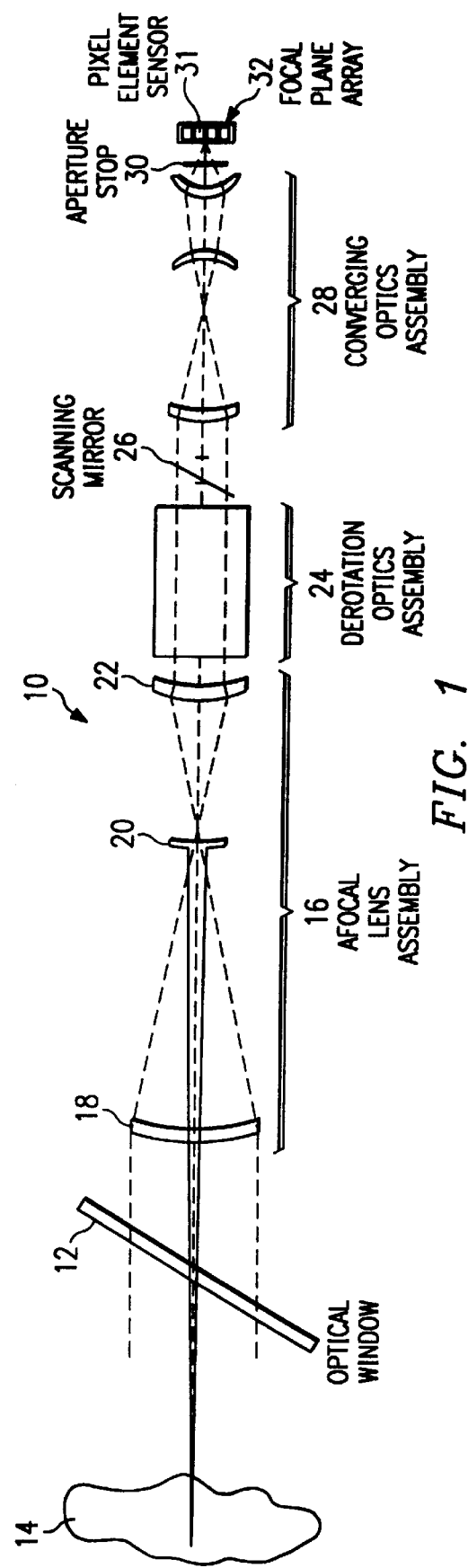

METHOD AND APPARATUS FOR CALIBRATING A FOCAL PLANE ARRAY OF AN IMAGE DETECTOR

CROSS REFERENCE TO RELATED APPLICATIONS

This application claims priority under 35 U.S.C. §119 of provisional application No. 60/009,719 filed Jan. 5, 1996.

TECHNICAL FIELD OF THE INVENTION

The present invention relates in general to image scanning and detection technology and more particularly to a method and apparatus for calibrating a focal plane array of an image detector.

BACKGROUND OF THE INVENTION

Image detecting systems typically scan scene based images onto a focal plane array made up of individual detector elements in order to detect viewed images. Each detector element within the focal plane array has a unique and different output voltage offset and gain reported upon detection of an image. These unique and different output voltage offsets and gains of the individual detector elements are a result of an inherent inability to produce identical detector elements during the manufacturing process. The inability to produce identical detector elements requires that an imaging system perform calibration on the focal plane array to compensate for the varying initial output voltage offsets and gains from one individual detector element to another despite detecting identical portions of an image.

Calibration of image detecting systems typically requires that calibration reference levels be viewed by the focal plane array during system operation. This calibration requirement can take time away from viewing the actual scene images. The calibration references of typical scan systems are thermo-electric devices that are optically viewed during the calibration period. However, these calibration references only provide an approximation of scene based energy and thus calibration is not performed on actual images. Therefore, it is desirable to perform calibration with actual scene based energy collected within a typical scan cycle.

SUMMARY OF THE INVENTION

From the foregoing, it may be appreciated that a need has arisen for an image detection system that performs calibration using scene based energy. In accordance with the present invention, a method and apparatus for calibrating a focal plane array of an image detector system are provided that substantially eliminate or reduce the disadvantages and problems associated with conventional focal plane array calibration techniques.

According to an embodiment of the present invention, there is provided a method of calibrating a focal plane array of an image detector that includes detecting a scene based image scanned by a first detector element at a first rotation position. All of or a portion of the same scene based image is then scanned by a second detector element at a second rotation position. An output of the first detector element generated at the first rotation position is compared to an output of the second detector element generated at the second rotation position. An adjustment is made to correction factors of the first and/or second detector elements in response to the comparison in order to compensate for the voltage offset and gain of the first and/or second detector elements. Likewise, remaining detector elements detect scene based images at the first and second rotation positions, so that output comparisons can be made for the entire detector array. Adjustments are made to the correction factors of the remaining detector elements in response to the comparisons in order to compensate for the voltage offset and gain variation of the remaining detector elements. The above process can be repeated for various rotation positions. The above process can also be repeated over time to enhance calibration uniformity.

The present invention provides various technical advantages over conventional calibration techniques. For example, one technical advantage is the use of scene based energy in performing the calibration of the individual detector elements in the focal plane array. Another technical advantage is performing calibration at different rotation positions. Yet another technical advantage is to perform calibration with the same lens configuration as used during image detection operation. Other technical advantages are readily apparent to one of ordinary skill in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates an optical configuration of an image detecting system; and

DETAILED DESCRIPTION OF THE INVENTION

Figure 2A:
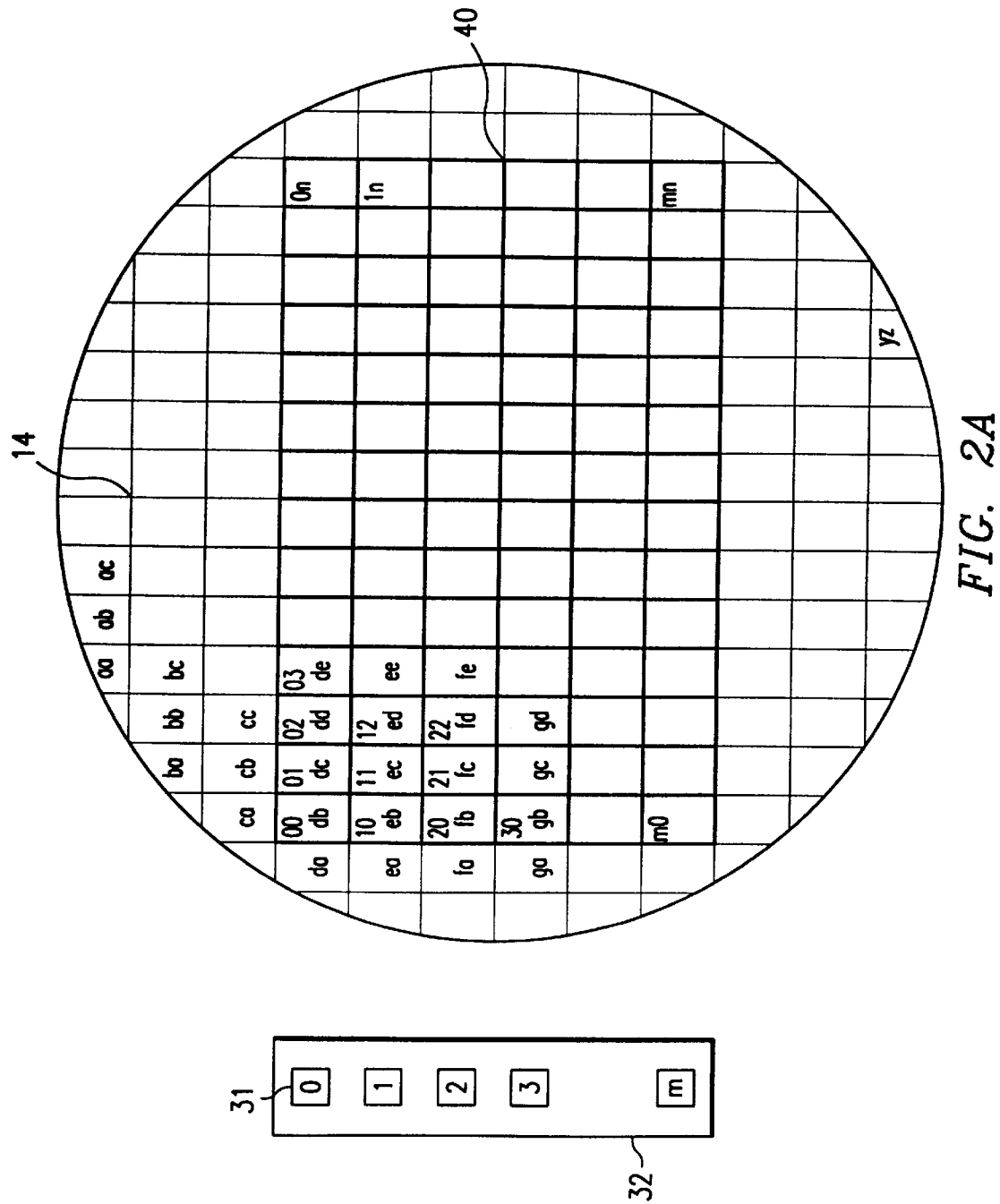
FIGS. 2A–B illustrate individual detector elements in the image detecting system at a first rotation position and a second rotation position.

FIG. 1 is a block diagram of an optical configuration for an image detection system 10. Image detection system 10 includes an optical environmental interface 12, such as a window or dome, for receiving energy from a scene 14. Energy from scene 14 passes through optical environmental interface 12 to an afocal lens assembly 16. Afocal lens assembly 16 includes an objective lens 18, a field lens 20, and an eyepiece lens 22. Energy from scene 14 passes through objective lens 18, field lens 20, and eyepiece lens 22 of afocal lens assembly 16 to a derotation optics assembly 24 for stabilization. Scene based energy continues to pass through derotation optics assembly 24 to a scanning mirror 26. Scanning mirror 26 scans the scene based energy across a converging optics assembly 28. Scanned scene based energy passes through converging optics assembly 28 and through an aperture stop 30 for image detection by individual detector elements 31 within a focal plane array 32.

Image detection system 10 may operate in a cyclical manner. A cycle may be defined as the time it takes to complete one repetitive maneuver of scanning mirror 26. Each cycle consists of a series of time sequential phases. The time sequential phases may include an image forming phase, a transition phase, a calibration phase, and a flyback phase. The image forming phase allows for image detection of scene 14 by individual detector elements 31 of focal plane array 32. The calibration phase allows for the correction of gain and voltage offset parameters to be performed on individual detector elements 31. The transition phase allows for image detection system 10 to prepare for changing between image forming and calibration phases. The flyback phase allows for scanning mirror 26 to return to its initial scanning position.

During image forming operation, energy from scene 14 passes through optical environmental interface 12 and through objective lens 18, field lens 20, and eyepiece lens 22 of afocal lens assembly 16. Energy collection for image formation passes through field lens 20. In this fashion, objective lens 18, field lens 20, and eyepiece lens 22 function as an afocal telescope during the image forming operation. Scene based energy passing through field lens 20 proceeds through derotation optics assembly 24 onto scanning mirror 26. Scanning mirror 26 scans the scene based energy across focal plane array 32 through converging optics assembly 28 and aperture stop 30.

Objective lens 18 focuses scene based energy onto an intermediate image plane directly ahead of field lens 20. Field lens 20 controls the eyepiece size and exit pupil location for image detection system 10. Eyepiece lens 22 recollimates the scene based energy relayed from field lens 20 and directs it toward scanning mirror 26. Scanning mirror 26, located at the exit pupil, sweeps the optical bundle sequentially into the aperture of converging optics assembly 28. Derotation optics assembly 24 provides stabilization for the recollimated scene base energy to prevent scene based energy from optically rolling in front of converging optics assembly 28. Derotation optics assembly 24 may include a prism or other lens configuration to eliminate roll motion of the platform upon which the optical configuration of image detection system 10 is placed.

Converging optics assembly 28 forms an inverted image of the scanned scene based energy at another intermediate image plane before relaying it towards focal plane array 32. Individual detector elements 31 sequentially sample and store scene based energy from small areas of scene 14 into a multidimensional array. The multidimensional array is used to form an opto-electronic approximation of the radiometric detail within the afocal field of view. Aperture stop 30 ensures a constant optical system f/number in imager space for all phases of operation.

Figure 2B:
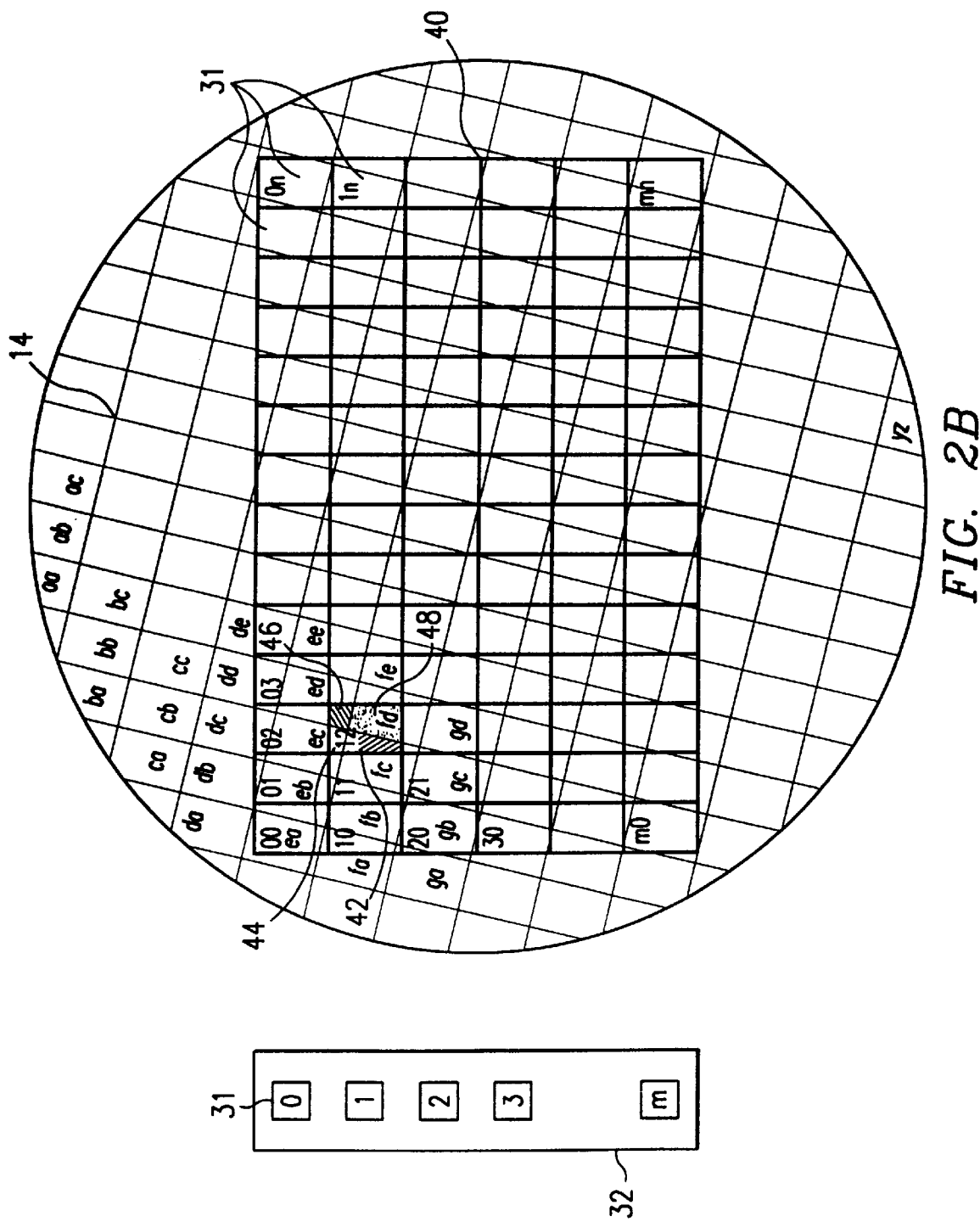

FIG. 1 and FIG. 2A show derotation optics assembly 24 placed at a first rotation position. FIGS. 2A–B show how calibration is performed on individual detector elements 31 of focal plane array 32. A focal plane array grid 40 represents individual detector elements 31 that may be implemented in either a scanning system or a staring system. In a scanning system, images are scanned across individual detector elements 31 and focal plane array grid 40 represents the image portions of scene 14 detected by individual detector elements 31. Individual detector elements 31 lie along a single one dimensional plane and images are directed across them by scanning mirror 26. In a staring system, each block of focal plane array grid 40 represents a separate detector element 31. Each detector element 31 is assigned a portion of the image to detect within the two dimensional array. For discussion purposes, the description of the calibration process will be referenced to a scanning system though calibration can also be performed in a substantially similar manner with a staring system.

At the first rotation position, images are scanned across individual detector elements $31_{0-n}$ resulting in scanned portions $31_{00-mn}$ of focal plane array grid 40. Each scanned portion $31_{00-mn}$ represents an image portion $14_{aa-yz}$ detected from scene 14. For example, scanned portion $31_{12}$ has scanned an image portion $14_{ed}$ from scene 14. Scanning continues until a first focal plane array grid 40 is generated. This scanning process is repeated by placing derotation optics assembly 24 at a second rotation position in order to generate a second focal plane array grid 40 as shown in FIG. 2B.

For calibration purposes, the image portions $14_{aa-yz}$ of individual detector elements 31 are compared. Correction factors for each individual detector element 31 are adjusted in response to the comparisons in order to compensate for the different voltage offsets and gains inherent in each individual detector element sensor 31. Calibration can thus be performed using scene based energy without taking unnecessary time away from actual image detection operation.

Comparisons are performed using geometric calculations of detected image portions $14_{aa-yz}$. For example, scanned portion $31_{11}$, $31_{21}$, $31_{12}$, and $31_{22}$ detect image portions $14_{ec}$, $14_{fc}$, $14_{ed}$, and $14_{fd}$, respectively, at the first rotation position. At the second rotation position, scanned portion $31_{12}$ detects an image portion containing a section 42 of image portion $14_{fc}$, a section 44 of image portion $14_{ec}$, a section 46 of image portion $14_{ed}$, and a section 48 of image portion $14_{fd}$. Since image portions $14_{fc}$, $14_{fd}$, $14_{ec}$, and $14_{ed}$ were detected at the first rotation position, the amount of contribution that sections 42, 44, 46, and 48 should make to scanned portion $31_{12}$ can be geometrically determined. A comparison of an estimate of what scanned portion $31_{12}$ should be viewing at the second rotation position, in response to image portions detected at the first rotation position, is made to what scanned portion $31_{12}$ actually viewed at the second rotation position. Adjustments are made to correction factors of individual detector elements 31 if any discrepancies are found. This process is performed for each individual detector element 31 and may include more than two different rotation positions.

In summary, calibration is performed in an image detection system using scene based energy. Derotation optics allow individual detector elements to collect image information at a first rotation position. The derotation optics also allow collection of scene based energy by the individual detector elements at a second rotation position. Comparisons are made to the outputs of each individual detector element at each rotation position. Adjustments are made to correction factors of each individual detector element in response to the comparisons in order to compensate for the inherent differences in voltage offsets and gains in each individual detector element.

Thus, it is apparent that there has been provided, in accordance with the present invention, a method and apparatus for calibrating a focal plane array of an image detector that satisfies the advantages set forth above. Although the present invention has been described with detail, it should be understood that various changes, substitutions, and alterations can be made herein. For example, though the present invention has been described in reference to a scanning system, a staring system may be used with equal effectiveness. Other examples are readily ascertainable by one skilled in the art and may be made without departing from the spirit and scope of the present invention as defined by the following claims.

What is claimed is:

1. A method of calibrating a focal plane array of an image detector, comprising:

detecting a portion of an image at a first detector element of the image detector for a first rotation position of the image relative to the image detector;

detecting the image portion at a second detector element of the image detector for a second rotation position of the image relative to the image detector;

comparing a first output of the first detector element in response to the image portion detected at the first rotation position to a first output of the second detector element in response to the image portion detected at the second rotation position; and adjusting an offset and gain of the first and/or second detector element in response to the comparing step.

2. The method of claim 1, further comprising the steps of:

detecting the image portion at the first detector element for the second rotation position;

comparing a second output of the second detector element detected at the first rotation position to the first output of the second detector element detected at the second rotation position; and adjusting the offset and gain of the first and/or second detector element in response to the step of comparing the first and second outputs of the second detector element.

3. The method of claim 2, including the steps of:

detecting the image portion at the first detector element for the second rotation position to obtain a second output of the first detector element; and determining a contribution to the image portion detected by the first detector element at the second rotation position from the image portion previously detected by the second detector element at the first rotation position.

4. The method of claim 3, wherein the contribution from the image portion detected by the second detector element at the first rotation position is determined by geometric interpolation.

5. The method of claim 1, including the steps of:

detecting the image portion at the first detector element for the second rotation position to obtain a second output of the first detector element; and determining contributions to the image portion detected by the first detector element at the second rotation position from the image portion detected by other detector elements at the first rotation position.

6. The method of claim 5, wherein the determining step includes determining an estimate of the image portion detected by the first detector element at the second rotation position from the contributions detected by the other detector elements at the first rotation position.

7. The method of claim 6, including the step of comparing the estimate with the image portion actually detected by the first detector element at the second rotation position.

8. The method of claim 1, wherein the detecting steps include scanning the image across the first and second detector elements.

9. The method of claim 1, wherein the detecting steps include detecting the image by assigning each of a plurality of individual detector elements a portion of the image to detect.

10. The method of claim 1, wherein the image portion is detected from a scene based energy source.

11. The method of claim 1, wherein a portion of the image detected by the second detector element at the second rotation position at least partly overlaps a portion of the image detected by the first detector element at the first rotation position.

12. An apparatus for calibrating a focal plane array of an image detector, comprising:

an afocal lens assembly for receiving and collimating scene based energy from a scene;

a derotation optics assembly for stabilizing the scene based energy;

a converging optics assembly for inverting the scene based energy; and a focal plane array for forming an opto-electronic approximation of the scene based energy, the focal plane array having a plurality of individual detector elements for generating the opto-electronic approximation, the derotation optics assembly placing the scene based energy in a first rotation position for collecting a first grid of the scene based energy at the individual detector elements, the derotation optics placing the scene based energy in a second rotation position for collecting a second grid of the scene based energy at the individual detector elements, the focal plane array comparing the first grid to the second grid for adjusting correction factors of each individual detector element in order to compensate for differing voltage offsets and gains among the plurality of individual detector elements.

13. The apparatus of claim 12, further comprising:

a scanning mirror for scanning the scene based energy across the plurality of individual detector elements, the plurality of individual detector elements being formed in a one dimensional plane.

14. The apparatus of claim 12, wherein the focal plane array determines an estimate for a portion of the scene based energy to be detected by a first one of the plurality of individual detector elements at the second rotation position from contributions detected by the plurality of individual detector elements at the first rotation position.

15. The apparatus of claim 14, wherein the focal plane array compares the estimate with the portion of the scene based energy actually detected by the first one of the plurality of individual detector elements at the second rotation position.

16. The apparatus of claim 12, wherein the plurality of individual detector elements are formed in a two dimensional grid array.

17. A method for calibrating an image detector which has a plurality of detector elements, comprising the steps of:

directing energy from a scene onto the image detector with a first orientation relative to the image detector;

detecting first image information with the image detector when the energy has the first orientation;

directing the energy onto the image detector with a second orientation relative to the image detector, the second orientation being different from the first orientation;

detecting second image information with the image detector when the energy has the second orientation;

comparing information from the first image information to information from the second image information; and adjusting an operational parameter associated with a selected one of the detector elements in response to said comparing step.

18. The method according to claim 17, wherein the first and second orientations are different rotational positions of the energy relative to the image detector.

19. A method according to claim 17, wherein the second image information includes an actual energy level detected by the selected detector element; and wherein said comparing step includes the steps of using information from the first image information to prepare an estimated energy level, which is an estimate of the energy that will be detected by the selected detector in the second orientation, and comparing the actual energy level and the estimated energy level for the selected detector element.

20. A method according to claim 19, wherein the first image information includes a respective detected energy level detected by each of the detector elements; and wherein said preparing step includes the step of determining a respective contribution to the estimated energy level from the detected energy level of each of a plurality of the detector elements.

21. A method according to claim 20, wherein said step of determining the respective contributions includes the step of carrying out a geometric interpolation analysis.

22. An apparatus, comprising:

a focal plane array which includes an image detector having a plurality of detector elements; and an optical section which can direct energy from a scene onto said image detector with first and second orientations relative to said image detector, the first orientation being different from the second orientation;

said focal plane array being operative to detect first image information and second image information with said image detector when the energy respectively has the first orientation and the second orientation, being operative to compare information from the first image information to information from the second image information, and being operative to adjust an operational parameter associated with a selected one of said detector elements in response to a result of the comparison.

23. An apparatus according to claim 22, wherein said detector elements of said image detector form a one-dimensional array, said optical section being operative to scan the energy across said array while said focal plane array is detecting the first image information and while said focal plane array is detecting the second image information.

24. An apparatus according to claim 22, wherein said detector elements of said image detector are arranged in a two-dimensional array.

25. An apparatus according to claim 22, wherein said optical section is operative to cause the first and second orientations to be respective different rotational positions of the energy relative to said image detector.

26. An apparatus according to claim 22, wherein the second image information includes an actual energy level detected by said selected detector element, and wherein said focal plane array is operative to effect the comparison of information from the first image information to information from the second image information by using the information from the first image information to prepare an estimated energy level, which is an estimate of the energy that will be detected by said selected detector in the second orientation, and thereafter comparing the actual energy level and the estimated energy level.

27. An apparatus according to claim 26, wherein the first image information includes a respective detected energy level detected by each of said detector elements, and wherein said focal plane array is operative to effect the preparation of the estimated energy level by determining a respective contribution to the estimated energy level from the detected energy level of each of a plurality of said detector elements.

28. An apparatus according to claim 27, wherein said focal plane array is operative to effect the determination of the respective contributions to the estimated energy level by carrying out a geometric interpolation analysis.

* * * * *